INVENTOR:-
RANDLE LESLIE ABBOTT
BY:- Glascock, Downing & Seibold
ATTORNEY

INVENTOR:-
RANDLE LESLIE ABBOTT
BY: Glascock, Downing & Seebold
ATTORNEY

United States Patent Office 3,367,213
Patented Feb. 6, 1968

3,367,213
CONTROL OF CHANGE-SPEED GEARINGS
Randle Leslie Abbott, Leamington Spa, England, assignor, by mesne assignments, to Auto Transmissions Limited, London, England, a company of Great Britain
Filed Mar. 21, 1966, Ser. No. 535,878
Claims priority, application Great Britain, Mar. 24, 1965, 12,374/65
9 Claims. (Cl. 74—781)

This invention relates to the control of an auxiliary two-speed gearing which is arranged to transmit drive between a main change-speed gearing of a motor road vehicle and a final drive gearing for the driven road wheels of the vehicle.

It is well-known in the art of vehicular change-speed gearings for an auxiliary two-speed gearing to have the engagement of its ratios controlled by an electrical switch arranged conveniently for operation by the driver of the vehicle, and for the auxiliary two-speed gearing to be operatively arranged between a main change-speed gearing of which the ratios are selected manually by the driver of the vehicle and a final drive gearing which is arranged to drive a pair of vehicle wheels through an intermediate differential gearing. For various reasons the controls to the auxiliary two-speed gearing are usually operatively associated with the gear selector mechanism of the main change-speed gearing such that the higher ratio of the auxiliary two-speed gearing cannot be engaged unless the highest ratio of the main change-speed gearing is engaged.

It is also well-known in the art of vehicular change-speed gearings to provide an automatic change-speed gearing for transmitting the drive from the vehicle prime mover to the final drive gearing, and for the automatic selection of the ratios to be arranged such that an appropriate ratio is engaged to suit the instantaneous operating conditions of the vehicle. As the power required to drive the vehicle increases as a function of road speed, the speed at which the driving axle is driven by the automatic change-speed gearing is usually taken as a criterion for determining when gear changes of the automatic change-speed gearing should be made. However, the ideal instant at which gear changes should be made also depends on the operating conditions of the prime mover and another control is usually operated by the throttle of the prime mover so that, during acceleration, gear changes from a lower to a higher ratio take place at a higher road speed than would otherwise be the case whereby a greater torque is available for accelerating the vehicle. If a gear change from a lower to a higher ratio, hereinafter called an "up-change," occurred at exactly the same road speed as a gear change from the higher to the lower ratio, hereinafter called a "down-change," there would inherently be a danger, whenever the vehicle is driven at the said road speed where both the up-change and the down-change are intended to occur, of the automatic change-speed gearing providing a neutral condition or of the clutches or brakes in the automatic change-speed gearing for providing the said lower and higher ratios fighting each other. In order to prevent this, it is arranged for an up-change between two gear ratios to take place at a higher road speed than the down-change, and the speed difference is usually termed the hysteresis.

If an auxiliary two-speed gearing is arranged between an automatic main change-speed gearing of a motor vehicle and a final gearing for the driven road wheels of the vehicle, a gear-change from the lower ratio of the auxiliary two-speed gearing to its higher ratio has the effect of decreasing the rotational speed of the power output member of the automatic main change-speed gearing and, unless the road speed of the vehicle is sufficiently high, the automatic gear-selecting unit of the main change-speed gearing will interpret this drop in the rotational speed of the power output member of the automatic main change-speed gearing as a reduction in road speed or an increase in load, and will cause the engagement of a lower ratio of the main change-speed gearing. Thus, whilst the engagement of the higher ratio of the auxiliary two-speed gearing is intended to decrease the overall reduction ratio between the vehicle engine and the driven road wheels, the act of engaging the higher ratio of the auxiliary two-speed gearing is liable to cause a down-change in the automatic change-speed gearing and, apart from counteracting the effect of engaging the higher ratio of the auxiliary two-speed gearing, the down-change in the automatic change-speed gearing will automatically cause the engagement of the lower ratio of the auxiliary two-speed gearing so that the overall reduction ratio between the engine and the driven road wheels is increased instead of being decreased as was intended. To make matters worse, the engagement of the lower gear of the auxiliary change-speed gearing will increase the rotational speed of the power output member of the automatic main change-speed gearing and will cause an up-change back to its highest ratio. The usual type of switch used for controlling the selection of the ratios of an auxiliary two-speed gearing is not of a self-cancelling variety, and the engagement of the highest ratio of the automatic main change-speed gearing will also cause the re-engagement of the higher ratio of the auxiliary two-speed gearing thus completing one cycle of this unstable sequence of undesirable gear changes. Even if the vehicle road speed is sufficiently high that the depression of the rotational speed of the power output member of the automatic main change-speed gearing is insufficient to cause a down-change, a reduction of road speed whilst the higher ratio of the auxiliary two-speed gearing is engaged will initiate the unstable sequence of undesirable gear changes.

It is an object of this invention to enable an auxiliary two-speed gearing to be arranged between an automatic main change-speed gearing of a motor vehicle and a final gearing for the driven road wheels of the vehicle without causing the aforementioned disadvantages.

According to the invention a control system, for an auxiliary two-speed gearing which is arranged to transmit drive between an automatic main change-speed gearing of a motor vehicle and a final gearing for the driven road wheels of the vehicle, includes a driver-actuable control adapted to effect a gear-change in the auxiliary gearing from its lower ratio to its higher ratio, an inhibitor means arranged to prevent the engagement of the said higher ratio of the auxiliary gearing, a fluid pressure operable device associated with the fluid control circuit of the automatic change-speed gearing for operation only when the highest gear ratio of the automatic change-speed gearing is engaged, and said fluid pressure operable device arranged when operated to actuate said inhibitor means to a non-inhibiting condition. Preferably the inhibitor means and the fluid pressure operable device are provided by a pressure-operable switch having its pressure tapping associated with the fluid control circuit of the automatic change-speed gearing and its electrical terminals operatively arranged in an electrical control circuit for the auxiliary gearing.

According to a further feature, the driver-actuable control may be an electrical switch of the self-cancelling type. With this arrangement, operation of the driver-actuable control to engage the higher ratio of the auxiliary gearing, whilst the highest gear ratio of the automatic change-speed gearing is engaged, will be frustrated if the road speed of the vehicle is too low, as the automatic change-speed gearing will start to make a down-change thereby causing the fluid pressure operable device to operate the inhibitor means to its inhibiting condition. Thus the higher ratio of the auxiliary gearing will be disengaged, the driver-actuable control will cancel itself, and the automatic change-speed gearing will revert to drive transmission at its highest ratio. Preferably the driver-actuable control switch has its contact member biased to an open condition but movable against the bias optionally to engage a live contact or an earthed contact, the contact member is electrically connected to the energising circuit of a relay which, when energised by the contact member engaging the live contact, is arranged to effect the engagement of the higher ratio of the auxiliary gearing and also to establish a self-energising connection whereby the relay will remain energised when the contact member is returned by the bias to the open condition but will be de-energised when the contact member is engaged with the earthed contact, and the pressure operable switch has its electrical terminals arranged to break the energising circuit of the relay except when the highest ratio of the automatic change-speed gearing is engaged. An indicator means is desirably arranged to be operated by the inhibitor means when the highest gear ratio of the automatic change-speed gearing is engaged whereby to indicate to the driver that actuation of the driver-actuable control will cause the engagement of the higher ratio of the auxiliary gearing provided that the road speed of the vehicle is sufficiently high.

According to a further feature, a second inhibitor means is arranged to prevent the engagement of the said higher ratio of the auxiliary gearing unless the road speed of the vehicle exceeds a value such that the drop in the rotational speed of the power output member of the automatic change-speed gearing, due to a gear-change in the auxiliary gearing from its lower ratio to its higher ratio, will cause a gear-change from the highest ratio of the automatic change-speed gearing to a lower ratio.

In the case where an electrical circuit is provided for controlling gear-changes in the auxiliary gearing such that the lower ratio of the auxiliary gearing will be engaged when the electrical circuit is in a first state and the higher ratio of the auxiliary gearing will be engaged when the electrical circuit is in a second state, the first inhibitor means is preferably a first electrical switch which is operated whenever the highest gear ratio of the automatic change-speed gearing is engaged, the second inhibitor means is a second electrical switch which is operated whenever the road speed of the vehicle exceeds said value, the driver-actuable control is a third electrical switch which is operated by the driver whenever it is desired to engage the higher ratio of the auxiliary gearing, and the first, second and third electrical switches are arranged such that the said electrical circuit will not be operated to its said second state until all three electrical switches have been operated.

According to a further feature the control system may include an indicator means arranged to be operated by the first inhibitor means and by the second inhibitor means when the highest gear ratio of the automatic change-speed gearing is engaged and the road speed of the vehicle exceeds the said value whereby to indicate to the driver that actuation of the driver-actuable control will cause the engagement of the higher ratio of the auxiliary gearing.

The invention is now described, by way of example only, with reference to the accompanying drawings, in which.

Figure 4:
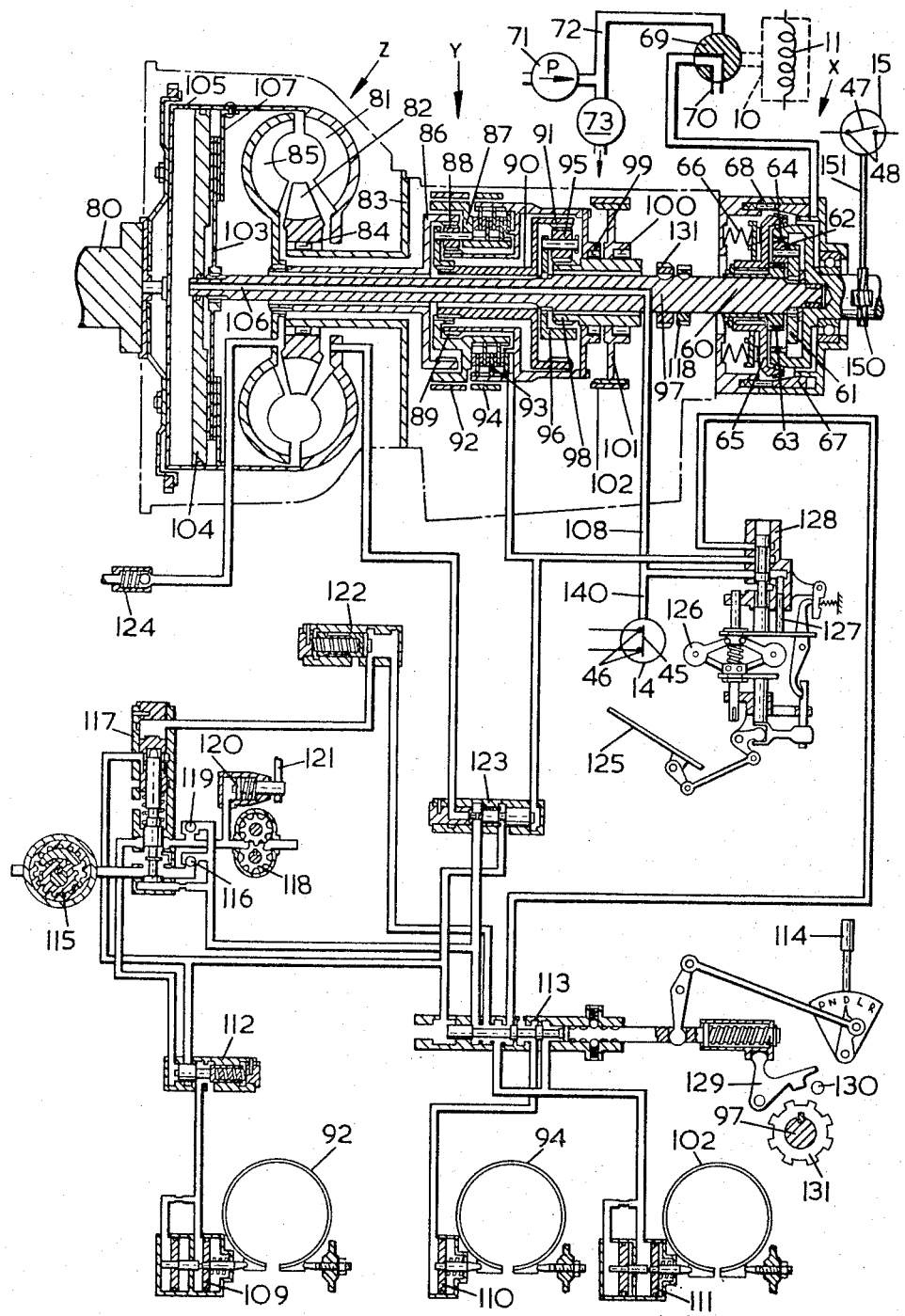
FIGURE 4 is a diagram of an automatic main change-speed gearing and an auxiliary gearing shown in section together with its control circuit and part of the control circuit for the auxiliary gearing.

The auxiliary overdrive epicyclic gearing is indicated by arrow X in FIGURE 4 and is of a well-known type in which a power input shaft 60 is arranged to drive a carrier 61 for planet gear wheels 62 which mesh with a sun gear wheel 63 and an annulus gear wheel 64 constituting the power output member. The sun gear wheel 63 is rotatively fast with a friction engaging member 65 which is biased by a series of springs 66 to clutch the sun gear wheel 63 to the annulus gear wheel 64 to inhibit planetary motion so as to provide a direct drive. A fluid-pressure operable piston 67 is held against rotation by a series of pins 68 and is arranged to move the friction engaging member 65 against the bias of the springs 66 to disengage the direct drive and to brake the sun gear wheel 63 to cause planetary motion so as to provide a planetary overdrive ratio. The application of fluid pressure to the piston 67 is controlled by a two-way valve 69 which is operated by a solenoid indicated generally by reference numeral 10, and the valve 69 is normally biased to the position shown in FIGURE 4 in which the piston 67 is connected to an exhaust fluid line 70. However, when the winding 11 of solenoid 10 is energised, the piston 67 is connected to fluid pressure from a pump 71 through a supply line 72 and is disconnected from the exhaust fluid line 70 so the planetary overdrive ratio is engaged, the fluid pressure being controlled by a pressure relief valve 73.

Figure 1:
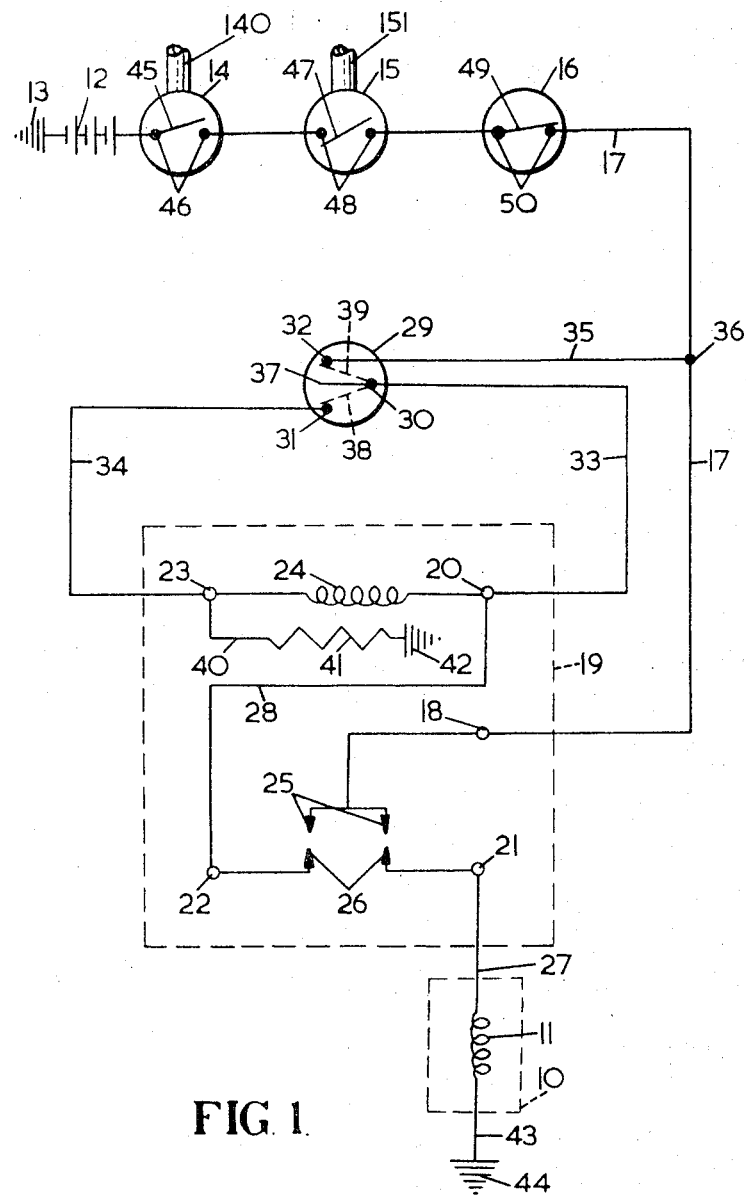
FIGURE 1 is a diagrammatic circuit for controlling the engagement of the ratios of an auxiliary overdrive epicyclic gearing arranged between an automatic main change-speed gearing of a motor vehicle and a final gearing constituting a power input gear pinion meshing with a crown gear wheel which is arranged to drive a pair of road wheels through a differential gearing.

Referring to the control circuit shown in FIGURE 1 for controlling the energisation of the winding 11 of the solenoid 10, a battery 12 has one terminal connected to earth at 13, and has the other terminal connected through three switches 14, 15 and 16 arranged in series and a wire 17 to a terminal 18 of a relay which is indicated generally by reference numeral 19. The relay 19 has four other terminals 20, 21, 22 and 23 and has a solenoid 24 which when energised simultaneously closes contacts 25 and 26 to complete an electrical circuit between terminal 18 and terminals 21 and 22. Terminal 21 is connected by a wire 27 to the winding 11 of the solenoid 10, and a wire 28 interconnects the terminals 20 and 22.

A driver-actuable control switch 29 has three terminals 30, 31 and 32 which are connected by respective wires 33, 34 and 35 leading respectively to terminals 20 and 23 and a junction 36 with wire 17. The movable member of the switch 29 is connected to the terminal 30 and is biased into the full-line position 37. The driver of the vehicle is able to move the movable member of the switch 29 against its bias away from the full-line position 37 either into the dotted-line position 38 so that terminals 30 and 31 are interconnected to establish an electrical connection between wires 33 and 34, or into the dotted-line position 39 so that terminals 30 and 32 are interconnected to establish an electrical connection between wires 33 and 35. However, as soon as the driver releases the movable member of the switch 29 it will return to the full-line position 37 thus breaking any connection between wire 33 and either of wires 34 or 35. The electrical circuit is completed by a wire 40 leading from terminal 23 through a fixed resistance 41 to earth at 42, and by a wire 43 connecting the solenoid 11 of valve 10 to earth at 44. The three earth connections 13, 42 and 44 would, of course, be interconnected through the vehicle chassis.

The switch 16 is normally closed and, as it is not an essential component for carrying out the invention, its function may be ignored until later and for this purpose it may be assumed that switch 15 is connected by wire 17 directly to terminal 18 and to wire 35. However, both of the switches 14 and 15 are normally open and no current can flow from the battery 12 to the switch 29, thereby preventing the engagement of the overdrive ratio of the auxiliary gearing until both switches 14 and 15 are closed to connect the battery 12 through wires 17 and 35 to terminal 32 of the switch 29.

The switch 14 is operatively connected to the gear-selecting means of the automatic main change-speed gearing, as will be described later with reference to FIGURE 4, such that its movable member 45 closes its contacts 46 whenever the highest gear ratio of the automatic gearing is engaged.

The switch 15 is centrifugally-operated and is arranged such that its movable member 47 closes its contacts 48, as will be described later with reference to FIGURE 4, when the road speed of the vehicle exceeds a value such that the drop in the rotational speed of the power output member of the automatic gearing, due to the engagement of the overdrive ratio of the auxiliary gearing, would cause a down-change in the automatic gearing.

In this manner the circuit for energising the winding 11 of solenoid 10 will be cut off from the electrical supply from the battery 12 until the highest gear ratio of the automatic gearing is engaged and the road speed of the vehicle is sufficiently high that engagement of the overdrive ratio of the auxiliary gearing will not be interpreted by the automatic gearing as a signal to effect a down-change.

Assuming that the switches 14 and 15 have closed the circuit between battery 12 and wire 17, it will be seen that the battery 12 is now connected to terminal 32 of the switch 29 through wire 35 and is also connected through terminal 18 to the contacts 25 which are separated from the contacts 26 as shown in the drawing as the solenoid 24 is not energised.

Actuation of the movable member of the driver-actuable control switch 29 from the full-line position 37 to the dotted-line position 39 allows current from the battery 12 to flow from wire 35 across contacts 32 and 30 and through wire 33 to terminal 20. As the contacts 25 and 26 are open, the wire 28 is isolated from earth and the current at terminal 20 will flow through the solenoid 24 to terminal 23 and, as the contacts 31 and 30 are open, the wire 34 is also isolated from earth and the current at terminal 23 will flow through wire 40 and the resistance 41 to earth at 42. This flow of current between terminals 20 and 23 energises the solenoid 24 so that the contacts 25 and 26 are closed and current from the battery 12 flows from terminal 18 through contacts 25 and 26 to terminals 21 and 22. From terminal 21 the current flows through the wire 27 and the winding 11 to earth at 44, thus energising the solenoid 10 to operate the valve 69 and to cause the engagement of to overdrive ratio of the auxiliary gearing. However, the supply of current to the terminal 22 establishes an alternative supply path of current from wire 17 to the terminal 20 and the solenoid 24 so that, when the movable member of the driver-actuable control switch 29 is released and returns under the action of its bias to the full-line position 37 thereby breaking the current supply to the solenoid 24 through wires 35 and 33, the solenoid 24 is still energised and holds the contacts 25 and 26 closed and thus maintains the current flow through solenoid 11 for an indefinite period. If at any time the road speed drops below the value at which the automatic gearing is liable to make a down-change during steady running conditions, the switch 15 will open the contacts 48 thus cutting off the supply of current to the wire 17 and isolating the solenoid windings 11 and 24 so that the direct ratio of the auxiliary gearing will be engaged and the contacts 25 and 26 will be opened so that the circuit is returned to its initial condition without any operation of the switch 29. Similarly, if the automatic gearing should make a down-change to provide extra torque to meet a specific operating condition, the switch 14 will open the contacts 46 thereby isolating the solenoid windings 11 and 24 and causing the direct ratio of the auxiliary gearing to be engaged.

Alternatively, if the overdrive ratio of the auxiliary gearing is engaged and the driver wishes to engage the direct ratio, the movable member of the driver-actuable control switch 29 is merely moved from the full-line position 37 against the bias to the dotted-line position 38 thus bridging the contacts 30 and 31 so that the terminals 20 and 23 are short-circuited and the solenoid 24 is deprived of current which will take the path of least impedance from terminal 22 to the earth connection 42. As the solenoid 24 is de-energised the contacts 25 and 26 will open thus breaking the circuit from wire 17 to the solenoid and de-energising the solenoid 11 so that the direct ratio of the auxiliary gearing will be engaged. When the movable member of the driver-actuable control switch 29 is released it returns to the full-line position 37 and the circuit is then restored to its original condition.

Whilst the overdrive ratio of the auxiliary gearing has the desirable effect of reducing engine speed at a given road speed thus reducing fuel consumption, the acceleration of the vehicle is correspondingly reduced. Accordingly, if desired, the switch 16 may be provided in series with the switches 14 and 15 as shown and be connected for operation by the throttle control of the engine such that the movable member 49 of the switch 16 will open its contacts 50 whenever the engine throttle is opened beyond a predetermined amount. In this manner the direct ratio of the auxiliary gearing will be engaged whenever the accelerator pedal is pushed hard by the driver whereby to give higher acceleration. The switch 16 has the further advantage in that some vehicles are designed for operation without an auxiliary gearing and the highest ratio of the automatic gearing is designed such that the maximum torque output of the engine will occur at the road speed which requires substantially that driving torque. In view of this it is impossible to increase the maximum road speed of the vehicle by engaging the overdrive ratio of the auxiliary gearing and the maximum road speed when the overdrive ratio is engaged is actually less than the maximum road speed attainable when the direct ratio of the auxiliary gearing is engaged. Thus the operation of the switch 16 ensures that the direct ratio of the auxiliary gearing is engaged under full throttle conditions so that the maximum road speed may be attained.

If desired, the wire 17 may be connected to operate an indicator light or other indicator means so that the driver of the vehicle can ascertain when the switches 14, 15 and 16 are closed and accordingly when the overdrive ratio of the auxiliary two-speed gearing an be engaged.

With reference to FIGURE 4, the automatic main change-speed gearing is indicated generally by arrow Y and is of a well-known type. The automatic gearing itself does not form part of the present invention and is only shown to illustrate the arrangement of the switches 14 and 15 and its association with the overdrive. To enable the operation of the automatic gearing Y to be understood by those skilled in the relevant art, its construction is now briefly described. The engine crankshaft 80 drives the impeller 81 of a torque converter which is indicated generally by arrow Z. The stator 82 of the torque converter Z is connected to a stationary casing 83 by a unidirectional clutch 84 in the well-known manner and the turbine 85 of the torque converter Z is drivingly connected to an input annulus gear 86 of the automatic gearing Y. A planet carrier 87 supports a number of planet gear wheels 88 meshing with the annulus 86 and a sun gear wheel 89, and is drivingly connected by a tubular sleeve 90 to an input annulus gear 91 of a second epicyclic gearing. The planet carrier 87 can either be held against rotation by a contractile brake band 92 or can be clutched to the sun gear wheel 89 by a multi-plate clutch 93. A further contractile brake band 94 is arranged, when operated, to hold the sun gear wheel 89 against rotation. The annulus gear 91 meshes with a number of planet gear wheels 95 supported by a planet carrier 96 rotatively fast with the power output shaft 97 from the automatic gearing Y. The planet gear wheels 95 also mesh with a sun gear wheel 98 which is connected through unidirectional clutches 99 and 100 respectively to the sun gear wheel 89 and a brake disc 101 which can be held against rotation when a contractile brake band 102 is operated. The power output shaft 97 is formed integral with the power input shaft 60 to the auxiliary overdrive gearing X and also extends toward the engine crankshaft 80 where it has a splined connection with a clutch plate 103. A piston 104 is axially slidable along the power output shaft 97 and is sealingly engaged with both the shaft 97 and a cylindrical portion 105 secured to the impeller so that, when fluid under pressure is applied through a longitudinal bore 106 formed in the shaft 97, the piston 104 will urge the clutch plate 103 against a radial flange 107 held rotatively fast with the portion 105 thereby clutching the engine crankshaft 80 directly to the power output shaft 97—this gives the highest drive ratio of the automatic gearing Y and it will be appreciated that, whenever this ratio is engaged, there will be fluid pressure in the longitudinal bore 106, and in the fluid duct 108 supplying the bore 106. This is the only portion of the automatic gearbox Y that has to be understood for appreciating the operation of the switches 14 and 15. However, the complete operating circuit for the automatic gearbox Y has been shown and we believe it advisable to point out that the three brake bands 92, 94 and 102 are also shown at the bottom of FIGURE 4 together with their respective operating pistons 109, 110 and 111, the remaining control elements being a reverse interlock valve 112, a selector valve 113 controlled by a driver operable selector arm 114, a front pump 115, a front pump check valve 116, a main relief valve 117, a rear pump 118, a rear pump check valve 119, a parking interlock piston 120, a parking pawl 121, and accumulator valve 122, a converter shuttle valve 123, a relief valve 124 for providing a lubricant supply, an accelerator pedal 125, a governor 126, a hydraulic detent 127, a governor valve 128, a parking pawl 129 and a parking interlock 130. The parking pawl 129 is engageable with a dogged wheel 131 which is keyed to the output shaft 97 and is also seen in the top right hand corner of FIGURE 4 next to the gear 118 of the rear pump. As previously mentioned the functioning of these various elements is well known in the art and forms no part of the present invention—however, it may be of interest to note that the lowest automatic ratio of the automatic gearing Y is obtained by operating the brake band 102, the intermediate automatic ratio is obtained by operating the brake band 102 and the multi-plate clutch 93, the direct ratio is obtained by operating the clutches 93 and 103, and the reverse drive ratio is obtained by operating the brake band 92. The brake band 94 is only operated when the lowest ratio is to be engaged under non-automatic conditions when the governor valve 128 is inoperative.

From this brief description of the automatic gearing Y it will be appreciated that the clutch 103 is only engaged whenever the highest ratio of the automatic gearing is engaged and, accordingly, fluid pressure only exists in the duct 108 when the highest ratio is engaged. The switch 14 is of the fluid-pressure operable kind and is connected by a passage 140 to the duct 108, whereby its movable member 45 will close the contacts 46 whenever the pressure in the duct 108 has risen to a value at which the piston 104 will have engaged the clutch 103 to provide the highest ratio of the automatic gearing Y.

On the other hand, the switch 15 is of the governor-operated variety and has its operating mechanism driven by skew gears 150 and a shaft 151 from the power output member 64 of the auxiliary overdrive gearing X, whereby its movable member 47 will close the contacts 48 whenever the rotational speed of the power output member 64 reaches a predetermined value, and hence the road speed of the vehicle has also reached a predetermined value. Although the switch 15 that has been described is mechanically driven, it should be understood that it may, if desired, be replaced by any kind of switch that will operate when the necessary predetermined road or engine speed has been exceeded. For instance, a fluid pressure-operable switch operated by a fluid pressure tapping from a duct in an automatic gearbox in which the fluid pressure varies as a function of engine or road speed.

Figure 2:
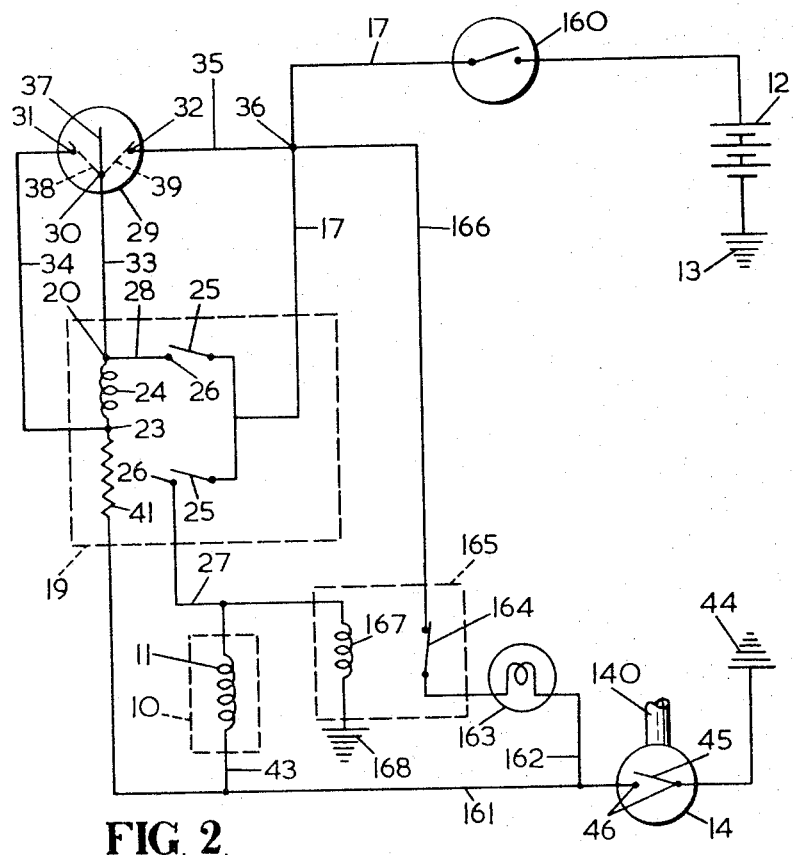
FIGURE 2 is a diagram illustrating an alternative circuit to that shown in FIGURE 1.

Although the switch 15 has a desirable effect in that it ensures, for steady running conditions, that the direct ratio of the auxiliary gearing will be engaged before a downchange in the automatic gearing occurs, it can be omitted if desired from the circuit shown in FIGURE 1, or as shown in FIGURE 2 in which like reference numerals have been used to identify the components common with FIGURE 1.

In FIGURE 2, the operation of the relay 19 and the driver-actuable control switch 29 are completely analogous with those described in FIGURE 1, and accordingly no further description of these components is necessary. The only switch shown in the wire 17 is an ignition switch 160 which is closed whenever the vehicle is operating. The fluid pressure-operable switch 14 is still essentially required but has been moved to a position intermediate the earth point 44 and a wire 161 which is connected both to the wire 43 from the solenoid winding 11 and is additionally connected to the fixed resistance 41 and, through a wire 162 to a warning light 163. The latter is connected through a normally closed switch 164 of a relay 165 and a wire 166 to the junction 36. The winding 167 for the relay 165 is connected between the wire 27 and an earth point 168. In operation, the ignition switch 160 will be closed and as soon as the switch 14 is closed by the engagement of the highest ratio of the automatic gearing Y, a circuit will be established through wires 17 and 166, the closed switch 164, the warning light 163, the wires 162 and 161, and the closed switch 14 so that the warning light will be illuminated. The warning light 163 is arranged in a conspicuous position on the vehicle dashboard such that its illumination will indicate to the driver that the highest ratio of the automatic gearing Y has engaged and it is probably possible to engage the overdrive ratio of the auxiliary gearing X. Subsequent operation of the driver-actuable control switch 29 will close the contacts 25 and 26 of the relay 19 thereby locking the relay in its energised condition whilst the movable member of the switch 29 returns to its full line position 37, and also energising the winding 11 of the solenoid 10 for engaging the overdrive ratio of the auxiliary gearing X, and energising the winding 167 of the solenoid 165 for breaking the switch 164 so that the warning light 163 will be extinguished. Provided that the road speed is sufficiently high, the overdrive ratio will remain engaged. However, if the road speed is so low that the engagement of the overdrive ratio causes the automatic gearing Y to make a down-change, the pressure acting on the piston 104 will drop together with the pressures in ducts 108 and 140. By arranging the switch 14 such that it will open as soon as the pressure in ducts 108 and 140 starts to drop, the solenoid windings 11, 24 and 167 will be de-energised before the highest ratio of the automatic gearing Y can be disengaged, and this will abort the attempt to engage the overdrive ratio as the movable member of the driver-actuable control switch 29 will be in its full line position and the contacts 25 and 26 of the relay 19 will remain open until the control switch 29 is operated again. In this manner any attempt to engage the overdrive ratio of the auxiliary gearing X will be aborted if the road speed is too low, and there will not be any risk of the initiation of a repetitive sequence of unstable gear changes. Operation of the driver-actuable control switch 29 will not successfully engage the overdrive ratio of the auxiliary gearing X until the road speed is sufficiently high that the automatic gearing Y will not make a down-change. If desired, the warning light 163 and the relay 165 may be omitted.

Figure 3:
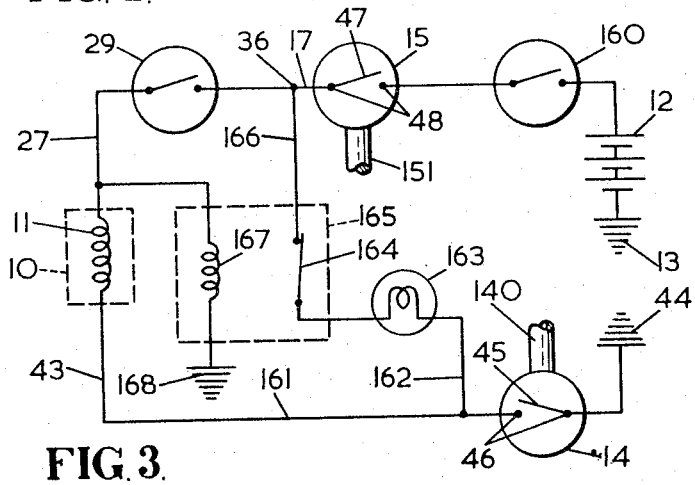
FIGURE 3 is a diagram illustrating an alternative circuit to those shown in FIGURES 1 and 2.

The circuit shown in FIGURE 3 has many components and connections common to FIGURES 1 and 2 and, for this reason, the same reference numerals have been used for corresponding items, and only the differences will be described. With reference to FIGURE 3, the main alterations made with respect to the circuit shown in FIGURE 2 are that the relay 19 has been omitted, the driver-actuable control switch 29 is in the form of a simple make or break switch, and the speed responsive switch 15 is arranged in series in the wire 17 between the ignition switch 160 and the junction 36. The function of the components used is the same as described with reference to FIGURE 2 with the exception that the driver-actuable control switch 29 merely completes or breaks the circuit between junction 36 and the wire 37. Thus, when the switches 14, 15 and 160 are all closed, the warning light 163 will be illuminated indicating that closing of the switch 29 will successfully cause the engagement of the overdrive ratio of the auxiliary gearing X. On the other hand, if the switch 29 is opened the solenoid winding 11 will be de-energised and the auxiliary gearing X will revert to its direct drive condition. Similarly, if the switch 14 is opened due to a down-change occurring in the automatic gearing Y, or the switch 15 is opened due to the road speed falling below the said predetermined value, the overdrive ratio of the auxiliary gearing X will be disengaged. However, unless the driver-actuable control switch 29 is opened by the driver, the overdrive ratio of the auxiliary gearing X will be engaged automatically as soon as the switches 14 and 15 have closed again. As the switch 29 is not of the self-cancelling type, the speed responsive switch 15 is an essential element of the circuit. However, the solenoid 165, the warning light 163 and the ignition switch 160 may be omitted if so desired.

If desired the circuits shown in the drawings may be replaced by analogous electrical circuits, or by equivalent fluid-operable circuits, or by equivalent mechanical arrangements. Although the invention has been specifically described with reference to an overdrive auxiliary epicyclic gearing of a specific construction, it should be understood that other types of auxiliary overdrive or underdrive gearing may be used without departing from the teaching of the present invention.

What I claim as my invention and desire to secure by Letters Patent of the United States is:

1. A control system, for an auxiliary two-speed gearing arranged to transmit drive between a fluid controlled automatic main change-speed gearing of a motor vehicle and a final gearing for the driven road wheels of the vehicle, including an electrical circuit for controlling the gear selection in the auxiliary gearing, said electrical circuit including a driver-actuated switch operable to cause said circuit to effect a gear-change in said auxiliary gearing, and a pressure operable electrical switch consisting of a fluid pressure operable device which is tapped to the fluid control circuit of the automatic gearing whereby the fluid pressure operable device will be operated by the pressure in said fluid control circuit when the highest ratio of the automatic gearing is engaged, and the pressure operable electrical switch further consisting of an inhibiting means actuated by the operation of the fluid pressure operable device to cause said electrical circuit to operate from a condition in which the engagement of the higher ratio of said auxiliary gearing is inhibited to a condition in which the higher ratio of said auxiliary gearing is not inhibited.

2. A control system, as in claim 1, including an indicator means, and said inhibiting means arranged to operate the indicator means when the highest gear ratio of the automatic gearing is engaged whereby to indicate to the driver that actuation of the driver-actuable switch will cause the engagement of the higher ratio of the auxiliary gearing.

3. A control system, as in claim 1, wherein said driver-actuated switch is self-cancelling.

4. A control system, as in claim 3, in which the self-cancelling electrical switch includes a live contact, an earthed contact and a driver-actuable contact member optionally movable from a first position in which it is isolated from both contacts either to a second position in which it engages the live contact or to a third position in which it engages the earthed contact, means biasing the driver-actuable contact member resiliently towards its said first position, a relay including relay contacts and an energising circuit for controlling said relay contacts, an electrical connection between the contact member and said energising circuit whereby movement of the contact member to its second position will energise said energising circuit and movement of the contact member to its third position will de-energise said energising circuit, said electrical circuit operable from a first state to a second state, said electrical circuit in the first state arranged to cause the lower ratio of the auxiliary gearing to be engaged, said electrical circuit in the second state arranged to cause the higher ratio of the auxiliary gearing to be engaged, a self-energising electrical connection for said energising circuit controlled by said relay contacts, said energising circuit when energised arranged to control said relay contacts to operate said electrical circuit to its said second state and also to complete the self-energising connection, said energising circuit when de-energised arranged to control said relay contacts to operate said electrical circuit to its said first state and also to break the self-energising connection, and the pressure operable switch has its electrical terminals arranged to break the energising circuit of the relay except when the highest ratio of the automatic gearing is engaged.

5. A control system, as in claim 4, including an indicator means, and said inhibitor means arranged to operate the indicator means when the highest gear ratio of the automatic gearing is engaged whereby to indicate to the driver that actuation of the driver-actuable control will cause the engagement of the higher ratio of the auxiliary gearing.

6. A control system, as in claim 3, including an indicator means, and said inhibitor means arranged to operate the indicator means when the highest gear ratio of the automatic gearing is engaged whereby to indicate to the driver that actuation of the driver-actuable control will cause the engagement of the higher ratio of the auxiliary gearing.

7. A control system, as claimed in claim 1, including a road speed responsive device comprising a second inhibiting means to cause said circuit to operate from a condition in which the engagement of the higher ratio of said auxiliary gearing is inhibited to a condition in which the higher ratio of said auxiliary gearing is not inhibited when the road speed of the vehicle exceeds a predetermined value at which a gear-change in the auxiliary gearing from its lower ratio to its higher ratio will cause a gear-change from the highest ratio of the automatic gearing to a lower ratio.

8. A control system, as in claim 7, wherein said electrical circuit is operable between a first state and a second state, said electrical circuit in said first state arranged to cause the engagement of the lower ratio of the auxiliary gearing, said electrical circuit in said second state arranged to cause the engagement of the higher ratio of the auxiliary gearing, a first electrical switch constitutes said first inhibitor means and is arranged to be operated whenever the highest gear ratio of the automatic gearing is engaged, a second electrical switch constitutes said second inhibitor means and is arranged to be operated whenever the road speed of the vehicle exceeds said predetermined value, a third electrical switch constitutes said driver-actuable switch and is arranged to be operated by the driver whenever it is desired to engage the higher ratio of the auxiliary gearing, and the first, second and third electrical switches are serially arranged in the electrical circuit such that the electrical circuit will not be operated to its said second state until all three electrical switches have been operated.

9. A control system, as in claim 8, including an indicator means arranged to be operated whenever both the first and second electrical switches are operated, whereby to indicate to the driver that operation of the third electrical switch will cause the engagement of the higher ratio of the auxiliary gearing.

References Cited

UNITED STATES PATENTS

| 2,763,162 | 9/1956 | Herndon | 74—645 |
| 2,946,240 | 7/1960 | Kop | 74—781 |
| 3,313,182 | 4/1967 | Nallinger | 74—740 |

CARLTON R. CROYLE, *Primary Examiner.*

MARK M. NEWMAN, *Examiner.*

C. LEEDOM, *Assistant Examiner.*